(No Model.)
J. McGINLEY.
FAUCET.
No. 269,531. Patented Dec. 26, 1882.
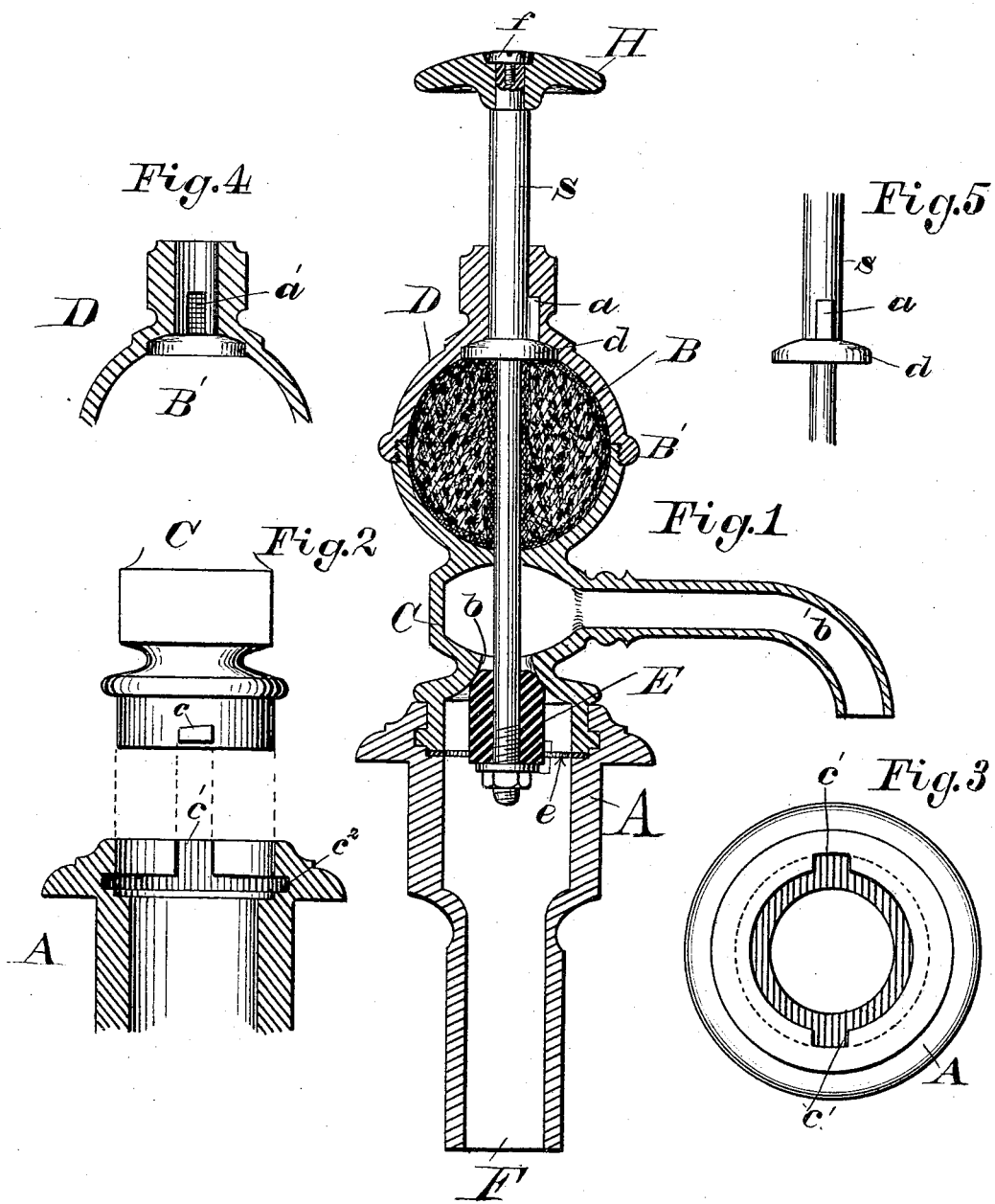
Attest
R. A. Staley
Trait Johnson
Inventor
James McGinley
BY
H. Harrison
Attorney

UNITED STATES PATENT OFFICE.

JAMES McGINLEY, OF CHICAGO, ILLINOIS.

FAUCET.

SPECIFICATION forming part of Letters Patent No. 269,531, dated December 26, 1882.

Application filed February 18, 1882. (No model.)

*To all whom it may concern:*

Be it known that I, JAMES MCGINLEY, a citizen of the United States of America, residing at Chicago, in the county of Cook and State of Illinois, have invented certain new and useful Improvements in Faucets, of which the following is a specification.

My invention relates to faucets for hydrants, &c.; and it consists in the combination therewith of a vulcanized-rubber sponge-ball, and also in certain details of construction, as hereinafter more fully described and claimed.

In the annexed drawings illustrating my invention, Figure 1 is a sectional elevation of my improved faucet. Fig. 2 is a sectional elevation, and Fig. 3 is a sectional plan, showing in detail the manner of connecting the parts A and C; and Figs. 4 and 5 are details showing the manner of locking the spindle.

Similar letters of reference refer to similar parts throughout the several views.

A is the lower piece of the faucet, which fits in the slab.

C is the center part of the faucet, which is provided with spout $b'$, and is connected at its lower end to the part A and at its upper end to the top part or piece, D.

The parts A, C, and D are separate pieces which are readily connected together, and united form the outside casing of the faucet, having within the several parts, as hereinafter described. The pieces A, C, and D are made in the shape as shown in Fig. 1. The lower part of D and the upper part of C united form a hollow sphere or chamber, $B'$, for the reception of the vulcanized-rubber sponge-ball B. The part D screws on the part C, so that it can be readily unscrewed and disconnected therefrom and the chamber $B'$ examined and cleaned and the rubber sponge-ball B removed at will. The part D is further provided with a slot, $a'$, as shown in Fig. 4, for the reception of the lug $a$ to lock the spindle S.

S is the stem or spindle of the faucet, provided at its upper end with a handle or knob, H, which is held in its place by the screw $f$. The spindle S is provided at or near its center with a collar, $d$, above which is a lug, $a$. The lower end of the spindle is threaded and provided with a nut and washer, whereby the stem or spindle S is adjustable and the valve-collar now in use dispensed with.

E is a vulcanized-rubber valve on the lower end of the spindle S, and having a bearing against the valve-seat $b$. It is held in position by the nut and washer on the end of the spindle.

B is a vulcanized-rubber sponge-ball, which fits or rests in the chamber $B'$. It is vulcanized on its outside, and has through its center a hole for the passage of the stem or spindle S, the surface of this hole being vulcanized, so as to prevent the water from soaking through into the sponge, and the outside surface of the ball B being vulcanized for the same reason.

$c\ c$ are lugs on piece C, which enter into openings $c'\ c'$ in piece A and turn in groove $c^2$, as shown in Figs. 2 and 3, and there is a lead washer, $e$, to keep the connection tight and close, this connection of the parts C and A being thus made so that they can be separated readily, and yet, when connected, to be close, tight, and firm. All the parts of the faucet, with the exception of the parts B, E, and $e$, are made of brass, and may be nickel-plated, or they may be made of any material and ornamented, as may be desired.

F is a part attached to the water-pipe.

The manner of operation is as follows: The several parts of the faucet are attached together and the faucet connected to the water-pipe. To let on the water the spindle S is pushed down by pressing on the handle H, which will carry the valve E down, open the same, and allow the water to flow out through the spout $b'$. By removing the pressure from the handle H the stem S will be forced back to its normal position by the spring-ball B pressing against the collar $d$, the ball B having been previously compressed by the collar $d$. When the spindle S is forced back to its normal position it carries back the valve E and shuts the water off. When the stem S is pressed down it can be turned sufficiently to allow the lug $a$ to enter the slot $a'$ and lock the same, and the operator can remove his hand. The stem S will remain stationary or locked, and the water will continue to flow. When sufficient water has run the spindle is unlocked by simply turning it, and it will return to its normal position in the manner before described. The chamber B' may be examined and cleaned and the ball B removed by simply unscrewing the part D from the part C. The other inside parts of the faucet may be readily examined and cleaned by disconnecting C from D and A, or from A alone; and the spindle S can also be readily removed and the valve E examined, and if it is found that the valve is worn the wear can easily be overcome or allowed for by turning the nut on the threaded end of S, which will adjust the valve E and make a perfect fit. In Fig. 2, $c$ is shown tapered, and is for the purpose of making a snug fit in $c^2$.

The device just described makes a durable and convenient faucet, which may be used for hot and cold water, and for any and all purposes for which a faucet or cock may be used.

Having described my invention, what I claim as new, and desire to secure by Letters Patent, is—

1. A faucet provided with a rubber sponge-ball vulcanized on the outside and inside, substantially as and for the purpose specified.

2. In a faucet, the combination, with the detachable parts C D, forming chamber B', said part D having a slot, $a'$, of the perforated ball B, inclosed in said chamber, and the spindle S, having valve E, collar $d$, and lug $a$, all substantially as and for the purpose described.

In testimony whereof I affix my signature in presence of two witnesses.

JAMES McGINLEY.

Witnesses:
CHAS. KRESSMAN,
FRANK JOHNSON.